(12) United States Patent
Tateno et al.

(10) Patent No.: US 11,183,315 B2
(45) Date of Patent: Nov. 23, 2021

(54) CONDUCTIVE PASTE

(71) Applicant: SHOEI CHEMICAL INC., Tokyo (JP)

(72) Inventors: Hayato Tateno, Tosu (JP); Junichi Ikuno, Tosu (JP); Hiroshi Mashima, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 535 days.

(21) Appl. No.: 16/322,891

(22) PCT Filed: Jul. 18, 2017

(86) PCT No.: PCT/JP2017/025950
§ 371 (c)(1),
(2) Date: Feb. 1, 2019

(87) PCT Pub. No.: WO2018/025627
PCT Pub. Date: Feb. 8, 2018

(65) Prior Publication Data
US 2021/0323859 A1 Oct. 21, 2021

(30) Foreign Application Priority Data
Aug. 3, 2016 (JP) .............................. JP2016-152945

(51) Int. Cl.
*H01B 1/22* (2006.01)
*C03C 8/04* (2006.01)
*C03C 8/18* (2006.01)

(52) U.S. Cl.
CPC ................ *H01B 1/22* (2013.01); *C03C 8/04* (2013.01); *C03C 8/18* (2013.01)

(58) Field of Classification Search
CPC .. H01B 1/16; H01B 1/22; C03C 3/062; C03C 3/064; C03C 3/066; C03C 3/076; C03C 3/078; C03C 3/083; C03C 3/085; C03C 3/089; C03C 3/091; C03C 3/093; C03C 4/20; C03C 8/02; C03C 8/04; C03C 8/14; C03C 8/18; C03C 8/20; C08K 2201/001; C09D 5/24; H05K 1/092
See application file for complete search history.

(56) References Cited

U.S. PATENT DOCUMENTS 6,663,798 B2 * 12/2003 Sato .......................... H01B 1/22
252/512

FOREIGN PATENT DOCUMENTS

| CN | 101970369 A | 2/2011 | |
|---|---|---|---|
| CN | 102332320 A | 1/2012 | |
| EP | 1480233 A1 | 11/2004 | |
| JP | 07006623 A | 1/1995 | |
| JP | 07094306 A | 4/1995 | |
| JP | 2001297628 A | 10/2001 | |
| JP | 2006273653 A | * 10/2006 | ............ C03C 3/066 |
| JP | 2008085034 A | 4/2008 | |
| JP | 2012022841 A | 2/2012 | |
| JP | 2012022841 A | * 2/2012 | |
| JP | 2012059547 A | * 3/2012 | |
| JP | 2012059547 A | 3/2012 | |
| JP | 2013236092 A | 11/2013 | |
| JP | 5488282 B2 | 5/2014 | |
| JP | 5556518 B2 | 7/2014 | |
| JP | 2015041741 A | 3/2015 | |
| WO | 2007102287 A1 | 9/2007 | |
| WO | 2016039108 A1 | 3/2016 | |

OTHER PUBLICATIONS

English language machine translation of Tanaka et al. JP 2006-273653 A (Year: 2006).*
English language machine translation of Kato et al. JP 2012-022841 A (Year: 2012).*
English language machine translation of Kato et al. JP 2012-059547 A (Year: 2012).*
China National Intellectual Property Administration, Office Action and Search Report Issued in Application No. 201780047480.9, dated Nov. 27, 2019, 10 pages.
European Patent Office, Extended European Search Report Issued in Application No. 17836733.0, dated Feb. 14, 2020, Germany, 8 pages.

* cited by examiner

*Primary Examiner* — Matthew R Diaz
(74) *Attorney, Agent, or Firm* — Alleman Hall Creasman & Tuttle LLP

(57) ABSTRACT

A conductive paste comprising a conductive powder, a glass frit substantially free of lead, and an organic vehicle, wherein the glass frit contains 25 to 50 mol % B in terms of $B_2O_3$, 25 to 50 mol % Si in terms of $SiO_2$, 7 to 23 mol % Al in terms of $Al_2O_3$, 2 to 15 mol % Mg in terms of MgO, 2 to 5 mol % Ba in terms of BaO, one or two selected from the group consisting of 3 to 18 mol % Zn in terms of ZnO, and 3 to 8 mol % Ti in terms of $TiO_2$, based on the total number of moles in terms of the above oxides. According to the present invention, it is possible to provide a lead-free conductive paste having excellent resistance to dissolution in solder and acid resistance as well as being capable of forming fired films having excellent adherence and adhesion to a substrate.

16 Claims, 1 Drawing Sheet

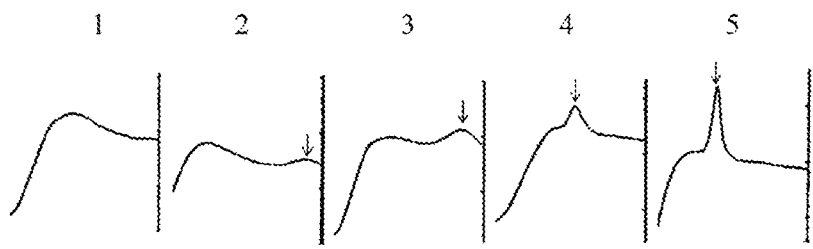
a degree of crystallization of

CONDUCTIVE PASTE

CROSS REFERENCE TO RELATED APPLICATIONS

This application is the national phase of International Application No. PCT/JP2017/025950, filed Jul. 18, 2017, which claims priority to Japanese Patent Application No. 2016-152945, filed Aug. 3, 2016, the entireties of which are hereby incorporated herein by reference for all purposes.

TECHNICAL FIELD

The present invention relates to a lead-free conductive paste suitable for being fired at a high temperature onto various ceramic electronic components such as chip resistors, laminated chip capacitors, and laminated chip inductors to thereby form electrodes on such ceramic electronic components.

BACKGROUND ART

A conductive paste is a material in a paste state prepared by homogeneously dispersing a conductive powder containing, as the main component, a metal, such as silver, copper, nickel, gold, palladium, platinum, and aluminum or an alloy such as silver-palladium, silver-copper, and silver-palladium-copper and a glass frit as an inorganic binder into an organic vehicle containing a resin and a solvent. In recent years, glass frits for use in conductive pastes have been required to be free of lead because of growing interest in environmental issues.

A conductive paste is used for forming electrodes on a chip-type ceramic electronic component, for example. In this case, the conductive paste is applied by various methods such as screen printing, dipping, and brush coating so as to form a predetermined pattern form onto a terminal part of a ceramic electronic component or the like and then fired at a high temperature of approximately 700 to 950° C. to thereby form a conductor film (thick film conductor). Thereafter, plating treatment is carried out on the conductor film as required to thereby form electrodes. Note that the numerical ranges expressed with "to" herein are intended to include the numerical values unless otherwise indicated. That is, "700 to 950° C." means a range of 700° C. or more and 950° C. or less.

When the ceramic electronic component thus obtained is mounted on a printed circuit board or the like by soldering, solder is applied on electrodes of the ceramic electronic component or on electrodes on the printed circuit board to attach the solder onto the electrodes of the ceramic electronic component or those on the printed circuit board. Then, after the ceramic electronic component is placed on the electrodes of the printed circuit board, the solder attached to the electrodes is reflowed to connect the electrodes of the ceramic electronic component to the electrodes of the printed circuit board mutually.

This solder material has been highly requested to be free of lead from an environmental point of view. Various lead-free solders have started to be used, instead of lead-tin-based solders, which have been most commonly used conventionally. There are various lead-free solders each having a different melting point. For electronic component applications, tin-silver-copper-based solders (Sn/3 Ag/0.5 Cu) which melt at a high temperature of approximately 260° C., for example, have been widely used.

Use of solders having a high melting point such as the above tin-silver-copper-based solders, however, has caused a disadvantage as follows. That is, conductive pastes have been designed and developed conventionally on the premise of use of a lead-tin-based solder having a soldering temperature of approximately 230 to 240° C. Use of a solder having a high melting point causes a metal contained as a conductive powder in a conductive paste to diffuse and dissolve in the melted solder, and a phenomenon, so-called "solder leach" becomes more likely to occur.

Additionally, through the influence of downsizing of electronic apparatuses and the like, properties required from electrodes have been diversified. Particularly, acidic plating solutions are often used when conductor films are subjected to plating treatment, and an improvement in the acid resistance of conductor films has been increasingly required.

Then, the applicant of the present application has suggested conductive pastes that may improve the acid resistance when used for forming electrodes to be plated as well as may improve resistance to dissolution in solder when used for forming electrodes to be soldered, by use of specific composition in aluminoborosilicate-based glass (Patent Literatures 1 and 2).

With these conductive paste, crystallization of glass frit is facilitated in firing the conductive pastes, fine crystals precipitate in a network form on a conductor film to densify the film structure of the conductor film. Thus, the resistance to dissolution in solder and acid resistance are improved.

CITATION LIST

Patent Literature

Patent Literature 1: Japanese Patent No. 5488282
Patent Literature 2: Japanese Patent No. 5556518

SUMMARY OF INVENTION

Technical Problem

The glass frits constituting the conductive pastes disclosed in Patent Literatures 1 and 2, however, may excessively crystallize depending on the environment fluctuation in firing and the like. In such a case, the fluidity of the conductive pastes decreases, and the adherence and adhesion between fired films (an electrode film and a conductor films) and a substrate may become sufficient.

The present invention has been made in order to solve such a problem, and it is an object thereof to provide a lead-free conductive paste having excellent resistance to dissolution in solder and acid resistance as well as being capable of forming fired films having excellent adherence and adhesion to a substrate.

Solution to Problem

The above problem will be solved by the present invention shown below.

(1) A conductive paste including a conductive powder, a glass frit substantially free of lead, and an organic vehicle, wherein
the glass frit contains 25 to 50 mol % B in terms of $B_2O_3$, 25 to 50 mol % Si in terms of $SiO_2$, 7 to 23 mol % Al in terms of $Al_2O_3$, 2 to 15 mol % Mg in terms of MgO, 2 to 5 mol % Ba in terms of BaO, one or two selected from the group consisting of 3 to 18 mol % Zn in terms of ZnO and 3 to 8 mol % Ti in terms of $TiO_2$, based on the total number of moles in terms of the above oxides.

(2) The conductive paste according to (1), wherein the conductive powder is a silver-based metal powder containing silver as a main component.

(3) The conductive paste according to (1) or (2), wherein the glass frit contains 25 to 40 mol % B in terms of $B_2O_3$, 25 to 45 mol % Si in terms of $SiO_2$, 11 to 18 mol % Al in terms of $Al_2O_3$, 4 to 11 mol % Mg in terms of MgO, 3 to 5 mol % Ba in terms of BaO, one or two selected from the group consisting of 3 to 15 mol % Zn in terms of ZnO and 3 to 5 mol % Ti in terms of $TiO_2$, based on the total number of moles in terms of the above oxides.

(4) The conductive paste according to any of (1) to (3), including one or more selected from the group consisting of zirconium oxide, titanium oxide, zinc oxide, precursors of zirconium oxide, precursors of titanium oxide, and precursors of zinc oxide, besides the components contained in the glass frit.

(5) The conductive paste according to any of (1) to (4), being a conductive paste for forming a primary electrode of a chip resistor.

Advantageous Effects of Invention

According to the present invention, it is possible to provide a lead-free conductive paste having excellent resistance to dissolution in solder and acid resistance as well as being capable of forming fired films having excellent adherence and adhesion to a substrate.

BRIEF DESCRIPTION OF DRAWINGS

FIG. 1 is one exemplary DTA profile obtained by TG-DTA measurement.

DESCRIPTION OF EMBODIMENT

The conductive paste of the present invention is a conductive paste that contains a conductive powder, a glass frit substantially free of lead, and an organic vehicle, wherein the glass frit contains 25 to 50 mol % B in terms of $B_2O_3$, 25 to 50 mol % Si in terms of $SiO_2$, 7 to 23 mol % Al in terms of $Al_2O_3$, 2 to 15 mol % Mg in terms of MgO, 2 to 5 mol % Ba in terms of BaO, one or two selected from the group consisting of 3 to 18 mol % Zn in terms of ZnO and 3 to 8 mol % Ti in terms of $TiO_2$, based on the total number of moles in terms of the above oxides.

The conductive paste of the present invention contains a conductive powder (A), a glass frit (B), and an organic vehicle (C) as essential components.

Examples of the conductive powder (A) according to the conductive paste of the present invention include, but are not particularly limited to, powders of noble metals such as silver, palladium, platinum, and gold, powders of base metals such as copper, nickel, cobalt, and iron, alloy powders constituted by two or more of these metals, and combined powders of which a surface is coated with another conductive material.

The conductive paste of the present invention has excellent resistance to dissolution in solder even when a powder containing, as the main component, silver, which is susceptible to solder leach, is employed as the conductive powder. Particularly, the conductive paste of the present invention can effectively suppress solder leach of silver even when a silver-based conductive powder having a silver content of 70% by mass or more in the conductive powder is employed as the conductive powder. Additionally, the conductive paste of the present invention has markedly excellent resistance to dissolution in solder for a silver-coated copper powder on the surface of which silver is exposed and the like, even when the silver content in the conductive powder is as low as 1 to 30% by mass, for example. Note that the "main component" herein refers to a component of which content is 50% by mass or more.

A silver-based conductive powder is constituted by a powder containing silver as the main component, and the content of silver in the silver-based conductive powder is 50% by mass or more, preferably 70% by mass or more, particularly preferably 80% by mass or more. The silver-based conductive powder can contain conductive metal components such as palladium, platinum, gold, copper, and nickel as conductive metal components other than silver, in order to improve the resistance to dissolution in solder, electrical conductivity, and a property of preventing silver migration. Examples of the silver-based conductive powder include mixed powders of silver and another conductive metal component, alloy powders of silver and another conductive metal component, combined powders in which the surface of another conductive metal component is coated with silver, and mixtures thereof. When the silver-based conductive powder contains another conductive metal component other than silver, the content of the other conductive metal component is preferably 0.1 to 30% by mass, in respect of electrical conductivity and costs. In the silver-based conductive powder, another conductive metal component other than silver is preferably palladium.

The average particle size of the conductive powder is not particularly limited and is preferably 0.1 to 10 μm. The conductive powder may be a mixed powder of two or more conductive powders each having a different average particle size. Examples of the shape of the conductive powder include, but are not particularly limited to, spherical powders and flake shaped powders, and the shape is appropriately selected. The conductive powder may be a mixed powder of two or more conductive powders each having a different shape. In the present invention, the average particle size of the conductive powder is the cumulative fraction value of 50% on a mass basis ($D_{50}$) to be measured by using a laser particle size distribution analyzer.

The glass frit (B) according to the conductive paste of the present invention is an aluminoborosilicate-based glass frit containing an oxide of B, an oxide of Si, an oxide of Al, an oxide of Mg, an oxide of Ba, and either one or both of an oxide of Zn and an oxide of Ti as the components thereof. The glass frit (B) contains components constituted by the following composition (i), (ii), or (iii) in terms of oxide and is substantially free of lead. In the present invention, "substantially free of lead" includes not only aspects in which no lead component is contained at all but also aspects in which lead is contained to a negligible extent (e.g., 1000 ppm or less) as an inevitable impurity.

Glass frit of composition (i): glass frit containing 25 to 50 mol %, preferably 25 to 40 mol % B in terms of $B_2O_3$; 25 to 50 mol %, preferably 25 to 45 mol % Si in terms of $SiO_2$; 7 to 23 mol %, preferably 11 to 18 mol % Al in terms of $Al_2O_3$; 2 to 15 mol %, preferably 4 to 11 mol % Mg in terms of MgO; 2 to 5 mol %, preferably 3 to 5 mol % Ba in terms of BaO; and 3 to 18 mol %, preferably 3 to 15 mol % Zn in terms of ZnO.

Grass frit of composition (ii): glass frit containing 25 to 50 mol %, preferably 25 to 40 mol % B in terms of $B_2O_3$; 25 to 50 mol %, preferably 25 to 45 mol % Si in terms of $SiO_2$; 7 to 23 mol %, preferably 11 to 18 mol % Al in terms of $Al_2O_3$; 2 to 15 mol %, preferably 4 to 11 mol % Mg in terms of MgO; 2 to 5 mol %, preferably 3 to 5 mol % Ba in terms of BaO; and 3 to 8 mol %, preferably 3 to 5 mol % Ti in terms of $TiO_2$.

Grass frit of composition (iii): glass frit containing 25 to 50 mol %, preferably 25 to 40 mol % B in terms of $B_2O_3$; 25 to 50 mol %, preferably 25 to 45 mol % Si in terms of $SiO_2$; 7 to 23 mol %, preferably 11 to 18 mol % Al in terms of $Al_2O_3$; 2 to 15 mol %, preferably 4 to 11 mol % Mg in terms of MgO; 2 to 5 mol %, preferably 3 to 5 mol % Ba in terms of BaO; 3 to 18 mol %, preferably 3 to 15 mol % Zn in terms of ZnO; and 3 to 8 mol %, preferably 3 to 5 mol % Ti in terms of $TiO_2$.

The content of each component, which is a proportion of the component in terms of the above oxide in the glass frit (B), is a content ratio of the component based on the total number of moles in terms of the above oxides.

The preferable range of each component can be optionally used in combination in each of the above compositions.

In the conductive paste of the present invention, with the composition of the glass frit (B) in the above ranges, it is possible to produce a dense metal-glass fired film structure.

The components are each only required to be contained in the amount in terms of the above oxides in the glass frit, and are not meant to be present as the above oxides in the glass frit. By way of an example, Si may be contained as SiO.

The content of B in the glass frit (B) is 25 to 50 mol %, preferably 25 to 40 mol % in terms of $B_2O_3$. With the content of B in terms of $B_2O_3$ in the glass frit (B) in the above range, the softening point of the glass is suppressed from rising to thereby enable moderate fluidity to be provided, and the acid resistance of the glass becomes satisfactory.

The content of Si in the glass frit (B) is 25 to 50 mol %, preferably 25 to 45 mol % in terms of $SiO_2$. With the content of Si in terms of $SiO_2$ in the glass frit (B) in the above range, the acid resistance of the glass becomes satisfactory, and the softening point of the glass is suppressed from rising to thereby enable moderate fluidity to be provided.

The content of Al in the glass frit (B) is 7 to 23 mol %, preferably 11 to 18 mol % in terms of $Al_2O_3$. With the content of Al in terms of $Al_2O_3$ in the glass frit (B) in the above range, the acid resistance of the glass becomes satisfactory, and crystallization is suppressed to thereby enable moderate fluidity to be provided.

Mg has a function of adjusting crystallization. The content of Mg in terms of MgO in the glass frit (B) is 2 to 15 mol %, preferably 4 to 11 mol %.

Ba suppresses crystallization and additionally has a function of adjusting the softening point. The content of Ba in terms of BaO in the glass frit (B) is 2 to 5 mol %, preferably 3 to 5 mol %. With the content of Ba in terms of BaO in the glass frit (B), moderate fluidity is likely to be provided, and the acid resistance of the glass becomes satisfactory.

Zn is a component that lowers the softening point of glass to thereby lower the fluidity thereof. The content of Zn in terms of ZnO in the glass frit (B) is 3 to 18 mol %, preferably 3 to 15 mol %. With the content of Zn in terms of ZnO in the glass frit (B) in the above range, a function of lowering the softening point to thereby lower the fluidity is likely to be provided, and the acid resistance of the glass becomes satisfactory.

Ti has a function of enhancing the acid resistance of the glass. The content of Ti in terms of $TiO_2$ in the glass frit (B) is 3 to 8 mol %, preferably 3 to 5 mol %. With the content of Ti in terms of $TiO_2$ in the glass frit (B), a function of enhancing the heat resistance of the glass is likely to be provided, and suppression of crystallization is facilitated.

The average particle size of the glass frit (B) is not particularly limited and is preferably 1.0 to 5.0 μm. In the present invention, the average particle size of the glass frit (B) is the cumulative fraction value of 50% on a mass basis ($D_{50}$) to be measured by using a laser particle size distribution analyzer.

The content of the glass frit (B) in the conductive paste of the present invention is not particularly limited and is appropriately selected within the range of the content usually used, depending on the purpose or application. The content of the glass frit (B) is preferably 1 to 15 parts by mass, particularly preferably 2 to 10 parts by mass based on the 100 parts by mass of the conductive powder. With the content of the glass frit (B) in the conductive paste in the above range, the resistance to dissolution in solder and the adherence to a substrate increase, and sufficient electrical conductivity as a conductor film can be provided.

A method for producing the glass frit (B) is not particularly limited. As the method for producing the glass frit (B), a method can be exemplified in which raw material compounds of components constituting the glass frit are mixed, and then, the mixture is melted, quenched, and pulverized. Additionally, examples of the method for producing the glass frit (B) include various methods such as sol-gel methods, spray pyrolysis methods, and atomization methods.

The organic vehicle (C) according to the conductive paste of the present invention is a component into which the conductive powder (A) and the glass frit (B) are dispersed. The component adjusts the physical properties of the conductive paste of the present invention, such as the printability, film formability, adherence to a substrate, and the like, in addition to the dispersibility of these inorganic components. Exemplary compositions of the organic vehicle (C) include organic binders and solvents. Examples of the organic binder include celluloses, butyral resins, acrylic resins, phenol resins, alkyd resins, and rosin esters. Examples of the solvent include organic solvents such as alcohol-based, ketone-based, ether-based, ester-based, hydrocarbon-based solvents, water, and mixed solvents thereof.

The content of the organic vehicle (C) in the conductive paste of the present invention is not particularly limited, and is adjusted appropriately in an appropriate amount at which insoluble components such as the conductive powder (A) and glass frit (B) may be retained in the conductive paste, depending on the usages and application method.

Furthermore, the conductive paste of the present invention may contain a metal oxide as an optional component, besides the components contained in the glass frit (B), in order to adjust various properties. One metal oxide other than the components contained in the glass frit (B) may be contained, or two or more such metal oxides may be contained in combination. The content of the metal oxide(s) other than the components contained glass frit (B) in the conductive paste of the present invention is appropriately selected depending on the purpose or application and, for example, is 0 to 10 parts by mass as the total amount in terms of oxide based on 100 parts by mass of the conductive powder.

Examples of the metal oxides other than the components contained in the glass frit (B) include various metal oxides such as bismuth oxide ($Bi_2O_3$), zirconium oxide ($ZrO_2$), copper oxides (CuO and $Cu_2O$), zircon ($ZrSiO_4$), alumina ($Al_2O_3$), silica ($SiO_2$), titanium oxides ($TiO_2$ and TiO), manganese oxides (MnO, $MnO_2$ and the like), zinc oxide (ZnO), and lanthanum oxide ($La_2O_3$). As the metal oxide other than the components contained in the glass frit (B), one or more selected from zirconium oxide, titanium oxides, and zinc oxide are preferable in that the resistance to dissolution in solder or acid resistance of the glass frit can be improved. The average particle size of the metal oxide other than the components contained in the glass frit (B) is preferably 5.0 μm or less. In the present invention, the average particle size of the metal oxide other than the components contained in the glass frit (B) is the cumulative fraction value of 50% on a mass basis ($D_{50}$) to be measured by using a laser particle size distribution analyzer.

The conductive paste of the present invention may also contain a metal oxide precursor, for example, a precursor that is to be a metal oxide when fired, such as organic metal compounds, besides the components contained in the glass frit (B).

The conductive paste of the present invention can contain appropriate additives such as plasticizers, dispersants such as higher fatty acids or fatty acid esters, surfactants, solid resins such as resin beads, which are usually added in order to adjust the various properties of the conductive paste, in addition to the above blends.

The conductive paste of the present invention is produced in accordance with a routine method by blending the conductive powder (A), the glass frit (B), a metal oxide(s) other than the components contained in the glass frit (B), such as a metal oxide(s) to be blended as required, and other additives in a proportion depending on the purpose or application and homogeneously dispersing the components together with the organic vehicle (C) by using a known kneading device such as a three-roll mill into a paste form.

The conductive paste of the present invention is used for forming a conductor or an electrode to be formed on a substrate or an electronic component. Hereinbelow, a case of forming an electrode on a substrate will be described, as an example.

The conductive paste of the present invention is applied by an appropriate method such as screen printing, dipping, and brush coating on a substrate in a desired pattern, and then fired at a high temperature of approximately 700 to 950° C. In the firing step, the glass frit (B) contained in the conductive paste of the present invention softens and flows during a temperature rising process and diffuses across the entire film and moistens the surface of the conductive powder to facilitate sintering. This allows a conductor film formed after firing, by use of the conductive paste of the present invention, to have a dense metal fired film structure. Furthermore, in the conductive paste of the present invention, at least a portion of the glass frit (B) migrates to the interface with the substrate as the viscosity drops due to the temperature rise to thereby allow the conductor film to firmly adhere to the substrate.

In the conductive paste of the present invention, the presence of glass remaining on the interface among sintered metal particles allows the metal fired film to be firmly retained to thereby form a dense metal fired film structure. Thus, a conductor film having no solder leach and having high adhesive strength can be obtained. So, even if the solder leach on a portion of the surface of the fired film occurs, dissolution is unlikely to proceed to the lower part. For this reason, with the conductive paste of the present invention, the resistance to dissolution in solder and the acid resistance are assumed to be significantly increased.

Conductor films obtained from the conductive paste of the present invention provide satisfactory results in a test of resistance to dissolution in solder or an acid resistance test which is more severe than in conventional examples of Patent Literatures 1 and 2 and the like.

Furthermore, in the conductive paste of the present invention, it is possible to form an excellent thick film conductor, which has excellent acid resistance and adherence and adhesion with a substrate, in addition to the resistance to dissolution in solder, and has high adhesive strength to any of various substrates, for example, insulative substrates including ceramic substrates such as alumina and barium titanate, glass substrates, glass ceramic substrates, and metal substrates such as stainless steel including an insulation layer formed on the surface thereof.

The conductive paste of the present invention, which is suitable for forming thick film conductor circuits and electrodes on various substrates, is preferably used particularly for forming electrodes for ceramic chip components such as chip resistors, laminated chip capacitors, and laminated chip inductors and other electronic components, and for forming a surface conductor layer of ceramic multilayer substrates.

A conductor film obtained by firing the conductive paste of the present invention particularly has excellent resistance to dissolution in solder and thus is suitably used for forming terminal electrodes of electronic components to be soldered or solder-coated, or electrodes on a substrate to which the electronic components are connected, for example.

The conductive paste of the present invention is also suitable for forming the primary electrode of a lead-free chip resistor obtained from the resistor composition described in No. WO 2016/039107 or the primary electrode of the lead-free chip resistor described in No. WO2016/039108, for example. Use of the conductive paste of the present invention for formation of these primary electrodes can improve the acid resistance of the entire chip resistor without degrading TCR, although the paste is free of lead.

A conductor film obtained from the conductive paste of the present invention is not necessarily soldered. For example, the film is suitably used also for a conductor pattern on a substrate that is entirely immersed in a solder bath so as to attach solder to electrodes formed on the back side or different positions of the substrate. Furthermore, the conductor film obtained from the conductive paste of the present invention is confirmed to have excellent acid resistance and thus is suitably used for electrodes to be plated.

EXAMPLES

In the present examples, a plurality of samples each having a different conductive paste composition was prepared, and the characteristics and properties of each sample were evaluated.

Example 1 and Comparative Example 1

(1) Preparation of Sample

Glass raw material compounds were weighed so as to achieve the glass compositions shown in Table 1. Each mixture obtained by mixing these compounds was melted at 1400 to 1600° C. After sufficient melting was confirmed, the mixture was removed from the furnace and quenched. The vitreous material obtained after quenching was pulverized in a ball mill by use of alumina balls until a glass frit having an average particle size of about 2.0 μm was obtained. In the present invention, the average particle size was measured by using a laser particle size distribution analyzer. The particle size distribution was measured to thereby determine the cumulative fraction value of 50% on a mass basis ($D_{50}$) as the average particle size.

Then, each glass frit obtained above in an amount (parts by mass) shown in Table 1, based on 100 parts by mass of a silver powder having an average particle size of about 0.8 µm, was mixed with an organic vehicle and the mixture was kneaded by using a three-roll mill. To the mixture, butyl carbitol was further added as a diluent. Each conductive paste was produced by adjusting the viscosity so as to be 100 to 400 Pa·s at 10 rpm.

Thereafter, each conductive paste was screen printed by using a 250-mesh screen on an alumina substrate. The alumina substrate was fired and retained at a peak temperature of 850° C. for 10 minutes to thereby obtain an alumina substrate on which a conductor film having a predetermined pattern was formed (specimen). The specimens obtained were referred to as samples 1 to 33.

solder bath was repeated seven times in total. In each sample taken out, the resistance value between the both ends of the pattern of 0.6 mm×62.5 mm was measured by a digital multimeter (manufactured by KEEITHLEY, Model 2002, measurement range: 0 to 20Ω). As the results of the measurement, a sample for which measurement of the resistance value was enabled was rated as "Good", and a sample with the resistance value exceeding the upper limit of the measurement range was rated as "Poor".

(Acid Resistance Test)

Each sample was immersed in a 5% sulfuric acid aqueous solution having a pH of 0.5 to 1.0 for 70 minutes and then taken out. Each sample taken out was subjected to a pencil scratch test and a tape peeling test to evaluate the acid resistance thereof by checking whether the coating film strength and the adherence to a substrate of the conductor film were maintained after the acid immersion.

TABLE 1

| | | Glass composition [mol %] | | | | | | Glass frit [parts by weight] | Conductive powder [parts by weight] |
|---|---|---|---|---|---|---|---|---|---|
| | | B2O3 | SiO2 | Al2O3 | MgO | BaO | TiO2 | ZnO | | |
| | Sample 1 | 27.8 | 41.6 | 13.9 | 5.6 | 3.7 | 7.4 | 0.0 | 4.5 | 100.0 |
| * | Sample 2 | 27.8 | 41.6 | 13.9 | 7.4 | 1.9 | 0.0 | 7.4 | 7.0 | 100.0 |
| | Sample 3 | 27.8 | 41.6 | 13.9 | 5.6 | 3.7 | 3.7 | 3.7 | 5.0 | 100.0 |
| | Sample 4 | 26.1 | 39.2 | 13.0 | 5.2 | 3.5 | 0.0 | 13.0 | 5.0 | 100.0 |
| | Sample 5 | 25.0 | 37.5 | 12.5 | 5.0 | 3.3 | 0.0 | 16.7 | 5.0 | 100.0 |
| * | Sample 6 | 26.3 | 39.4 | 13.2 | 5.3 | 8.8 | 0.0 | 7.0 | 5.0 | 100.0 |
| * | Sample 7 | 25.2 | 37.9 | 12.6 | 5.0 | 12.6 | 0.0 | 6.7 | 5.0 | 100.0 |
| | Sample 8 | 28.6 | 42.8 | 14.3 | 2.9 | 3.8 | 0.0 | 7.6 | 5.0 | 100.0 |
| | Sample 9 | 26.8 | 40.2 | 13.4 | 8.9 | 3.6 | 0.0 | 7.1 | 5.0 | 100.0 |
| | Sample 10 | 25.6 | 38.6 | 12.8 | 12.8 | 3.4 | 0.0 | 6.8 | 5.0 | 100.0 |
| * | Sample 11 | 11.4 | 51.2 | 17.0 | 6.8 | 4.5 | 0.0 | 9.1 | 5.0 | 100.0 |
| * | Sample 12 | 20.4 | 45.9 | 15.3 | 6.1 | 4.1 | 0.0 | 8.2 | 5.0 | 100.0 |
| | Sample 13 | 33.9 | 38.1 | 12.7 | 5.1 | 3.4 | 0.0 | 6.8 | 5.0 | 100.0 |
| | Sample 14 | 39.0 | 35.2 | 11.7 | 4.7 | 3.1 | 0.0 | 6.3 | 5.0 | 100.0 |
| | Sample 15 | 34.0 | 28.4 | 17.1 | 6.8 | 4.6 | 0.0 | 9.1 | 5.0 | 100.0 |
| | Sample 16 | 30.6 | 35.7 | 15.3 | 6.1 | 4.1 | 0.0 | 8.2 | 5.0 | 100.0 |
| | Sample 17 | 25.4 | 46.6 | 12.7 | 5.1 | 3.4 | 0.0 | 6.8 | 5.0 | 100.0 |
| * | Sample 18 | 23.4 | 50.8 | 11.7 | 4.7 | 3.1 | 0.0 | 6.3 | 5.0 | 100.0 |
| * | Sample 19 | 30.6 | 45.9 | 5.1 | 6.1 | 4.1 | 0.0 | 8.2 | 5.0 | 100.0 |
| | Sample 20 | 29.1 | 43.7 | 9.7 | 5.8 | 3.9 | 0.0 | 7.8 | 5.0 | 100.0 |
| | Sample 21 | 25.4 | 38.1 | 21.2 | 5.1 | 3.4 | 0.0 | 6.8 | 5.0 | 100.0 |
| | Sample 22 | 43.5 | 32.6 | 10.9 | 4.3 | 2.9 | 0.0 | 5.8 | 5.0 | 100.0 |
| | Sample 23 | 47.3 | 30.4 | 10.1 | 4.1 | 2.7 | 0.0 | 5.4 | 5.0 | 100.0 |
| * | Sample 24 | 27.3 | 40.8 | 13.6 | 5.5 | 5.5 | 0.0 | 7.3 | 5.0 | 100.0 |
| * | Sample 25 | 26.8 | 40.2 | 13.4 | 5.4 | 7.1 | 0.0 | 7.1 | 5.0 | 100.0 |
| * | Sample 26 | 44.0 | 7.4 | 22.1 | 8.8 | 5.9 | 0.0 | 11.8 | 5.0 | 100.0 |
| * | Sample 27 | 38.5 | 19.2 | 19.2 | 7.7 | 5.1 | 0.0 | 10.3 | 5.0 | 100.0 |
| * | Sample 28 | 29.4 | 44.1 | 14.7 | 9.8 | 0.0 | 0.0 | 2.0 | 7.0 | 100.0 |
| * | Sample 29 | 27.8 | 41.6 | 13.9 | 9.3 | 0.0 | 0.0 | 7.4 | 7.0 | 100.0 |
| * | Sample 30 | 30.0 | 45.0 | 15.0 | 8.0 | 2.0 | 0.0 | 0.0 | 7.0 | 100.0 |
| * | Sample 31 | 29.4 | 44.1 | 14.7 | 7.8 | 2.0 | 0.0 | 2.0 | 7.0 | 100.0 |
| * | Sample 32 | 29.4 | 44.1 | 14.7 | 5.9 | 3.9 | 0.0 | 2.0 | 7.0 | 100.0 |
| * | Sample 33 | 23.8 | 35.7 | 26.2 | 4.8 | 3.2 | 0.0 | 6.3 | 5.0 | 100.0 |

* Samples with no mark are of Examples, and samples marked with * are of Comparative Examples.

(2) Evaluation of Characteristics and Properties of Samples

Each sample was subjected to a test of resistance to dissolution in solder and an acid resistance test (tape peeling test and pencil scratch test) and then evaluated. The glass frit of each sample was subjected to a measurement of the degree of crystallization. The details of each test are shown as follows, and the results thereof are described in Table 2.

(Test of resistance to dissolution in solder) Each sample was immersed in flux. Thereafter, each sample was immersed in a Sn/3 Ag/0.5 Cu solder bath at 260° C. for 12 seconds and taken out from the bath. The immersion into this In the pencil scratch test, a 9H pencil manufactured by Mitsubishi Pencil Co., Ltd. was used to scratch the pattern of the conductor film, and then whether the conductor film was exfoliated from the alumina substrate was checked. A sample with no exfoliation was rated as "Good" and a sample with exfoliation was rated as "Poor".

In a tape peeling test, CELLOTAPE® (large roll, model no.: CT-18 tape) manufactured by Nichiban Co., Ltd. was attached onto the pattern of the conductor film. The tape was peeled off, and then whether the conductor film was exfoliated from the alumina substrate was checked. The evaluation score in a case of no exfoliation at all was set at 5.0.

The evaluation score when the area of the exfoliation was larger than 0% and less than 10% based on the area of the entire conductor film was set at 4.5.

Similarly, when the area ratio was 10% or more and less than 20%, the evaluation score was set at 4.0. In a case of the area ratio of 20% or more and less than 30%, the evaluation score was set at 3.5. In a case of the area ratio of 30% or more and less than 40%, the evaluation score was set at 3.0. In a case of the area ratio of 40% or more and less than 50%, the evaluation score was set at 2.5. In a case of the area ratio of 50% or more and less than 70%, the evaluation score was set at 2.0. In a case of the area ratio of 70% or more and less than 80%, the evaluation score was set at 1.5. In a case of the area ratio of 80% or more, the evaluation score was set at 1.0.

Samples having an evaluation score of 4.5 or more were recognized to have satisfactory adherence.

(Measurement of Degree of Crystallization)

TG-DTA measurement was conducted on each of the glass frits under identical conditions. One exemplary DTA profile obtained is shown in FIG. 1. A sample for which no crystallization peak was able to be observed in the DTA profile obtained from each glass frit was rated as having a degree of crystallization of 1. A sample for which observation of a crystallization peak was enabled was rated as having a degree of crystallization of 3, and a sample with the degree of crystallization between 1 and 3 (observation of a thing like a crystallization peak was slightly enabled) was rated as having a degree of crystallization of 2.

Furthermore, a sample with the aspect ratio of the half width of the height of crystallization peak observed (=height/half width) in the range of 1 or more and less than 5 was rated as having a degree of crystallization of 4, and a sample with the aspect ratio of 5 or more was rated as having a degree of crystallization of 5.

In the present Example, glass having a degree of crystallization of 1 is "a case in which substantially no crystal is present in the glass", and glass having a degree of crystallization of 5 is "a case in which crystals have excessively precipitated in the glass". Glass having a degree of crystallization of 2 to 4 was considered to be "a case in which crystallization has been moderately suppressed".

TABLE 2

|  | Degree of crystallization | Test of resistance to dissolution in solder | Pencil scratch test | Tape peeling test |
|---|---|---|---|---|
| Sample 1 | 4 | Good | Good | 4.5 |
| * Sample 2 | 3 | Good | Good | 3.5 |
| Sample 3 | 3 | Good | Good | 5.0 |
| Sample 4 | 3 | Good | Good | 5.0 |
| Sample 5 | 3 | Good | Good | 4.5 |
| * Sample 6 | 1 | Poor | Good | 1.0 |
| * Sample 7 | 1 | Poor | Good | 1.0 |
| Sample 8 | 3 | Good | Good | 4.5 |
| Sample 9 | 3 | Good | Good | 5.0 |
| Sample 10 | 3 | Good | Good | 4.5 |
| * Sample 11 | 1 | Good | Poor | 2.0 |
| Sample 12 | 1 | Good | Good | 3.0 |
| Sample 13 | 3 | Good | Good | 5.0 |
| Sample 14 | 3 | Good | Good | 5.0 |
| Sample 15 | 3 | Good | Good | 5.0 |
| Sample 16 | 3 | Good | Good | 4.5 |
| Sample 17 | 3 | Good | Good | 4.5 |
| * Sample 18 | 3 | Good | Poor | 3.5 |
| * Sample 19 | 1 | Poor | Good | 4.0 |
| Sample 20 | 3 | Good | Good | 4.5 |
| Sample 21 | 4 | Good | Good | 4.5 |

TABLE 2-continued

|  | Degree of crystallization | Test of resistance to dissolution in solder | Pencil scratch test | Tape peeling test |
|---|---|---|---|---|
| Sample 22 | 2 | Good | Good | 4.5 |
| Sample 23 | 2 | Good | Good | 4.5 |
| * Sample 24 | 1 | Poor | Good | 3.5 |
| * Sample 25 | 1 | Poor | Good | 3.5 |
| * Sample 26 | 5 | Good | Good | 4.0 |
| * Sample 27 | 4 | Good | Good | 4.0 |
| * Sample 28 | 4 | Good | Good | 2.5 |
| * Sample 29 | 3 | Good | Poor | 3.5 |
| * Sample 30 | 4 | Good | Poor | 3.5 |
| * Sample 31 | 3 | Good | Good | 3.0 |
| * Sample 32 | 3 | Good | Good | 4.0 |
| * Sample 33 | 5 | Good | Good | 4.0 |

* Samples with no mark are of Examples, and samples marked with * are of Comparative Examples.

Example 2

The test of resistance to dissolution in solder and the acid resistance test were conducted in the same manner as in Example 1 except that 2.0 parts by mass of zirconium oxide, 0.5 parts by mass of titanium oxide, and 4.0 parts by mass of zinc oxide based on 100 parts by mass of the silver powder were added to the conductive paste of the above sample 1, and 4.5 parts by mass of zirconium oxide, 0.2 parts by mass of titanium oxide, and 4.0 parts by mass of zinc oxide based on 100 parts by mass of the silver powder were added to the conductive pastes of the above samples 5, 12, and 23. Then, it was confirmed that the resistance to dissolution in solder and the acid resistance were improved.

The invention claimed is:

1. A conductive paste comprising a conductive powder, a glass frit substantially free of lead, and an organic vehicle, wherein
    the glass frit contains 25 to 50 mol % B in terms of $B_2O_3$, 25 to 50 mol % Si in terms of $SiO_2$, 7 to 23 mol % Al in terms of $Al_2O_3$, 2 to 15 mol % Mg in terms of MgO, 2 to 5 mol % Ba in terms of BaO, one or two selected from the group consisting of 3 to 18 mol % Zn in terms of ZnO and 3 to 8 mol % Ti in terms of $TiO_2$, based on the total number of moles in terms of the above oxides.

2. The conductive paste according to claim 1, wherein the conductive powder is a silver-based metal powder containing silver as a main component.

3. The conductive paste according to claim 1, wherein the glass frit contains 25 to 40 mol % B in terms of $B_2O_3$, 25 to 45 mol % Si in terms of $SiO_2$, 11 to 18 mol % Al in terms of $Al_2O_3$, 4 to 11 mol % Mg in terms of MgO, 3 to 5 mol % Ba in terms of BaO, one or two selected from the group consisting of 3 to 15 mol % Zn in terms of ZnO, and 3 to 5 mol % Ti in terms of $TiO_2$, based on the total number of moles in terms of the above oxides.

4. The conductive paste according to claim 1, further comprising one or more selected from the group consisting of zirconium oxide, titanium oxide, zinc oxide, precursors of zirconium oxide, precursors of titanium oxide, and precursors of zinc oxide, besides the components contained in the glass frit.

5. The conductive paste according to claim 1, wherein the conductive paste comprises a conductive paste for forming a primary electrode of a chip resistor.

6. The conductive paste according to claim 2, wherein the glass frit contains 25 to 40 mol % B in terms of $B_2O_3$, 25 to 45 mol % Si in terms of $SiO_2$, 11 to 18 mol % Al in terms of $Al_2O_3$, 4 to 11 mol % Mg in terms of MgO, 3 to 5 mol % Ba in terms of BaO, one or two selected from the group consisting of 3 to 15 mol % Zn in terms of ZnO, and 3 to 5 mol % Ti in terms of $TiO_2$, based on the total number of moles in terms of the above oxides.

7. The conductive paste according to claim 6, further comprising one or more selected from the group consisting of zirconium oxide, titanium oxide, zinc oxide, precursors of zirconium oxide, precursors of titanium oxide, and precursors of zinc oxide, besides the components contained in the glass frit.

8. The conductive paste according to claim 7, wherein the conductive paste comprises a conductive paste for forming a primary electrode of a chip resistor.

9. The conductive paste according to claim 2, further comprising one or more selected from the group consisting of zirconium oxide, titanium oxide, zinc oxide, precursors of zirconium oxide, precursors of titanium oxide, and precursors of zinc oxide, besides the components contained in the glass frit.

10. The conductive paste according to claim 9, wherein the conductive paste comprises a conductive paste for forming a primary electrode of a chip resistor.

11. The conductive paste according to claim 3, further comprising one or more selected from the group consisting of zirconium oxide, titanium oxide, zinc oxide, precursors of zirconium oxide, precursors of titanium oxide, and precursors of zinc oxide, besides the components contained in the glass frit.

12. The conductive paste according to claim 11, wherein the conductive paste comprises a conductive paste for forming a primary electrode of a chip resistor.

13. The conductive paste according to claim 2, wherein the conductive paste comprises a conductive paste for forming a primary electrode of a chip resistor.

14. The conductive paste according to claim 3, wherein the conductive paste comprises a conductive paste for forming a primary electrode of a chip resistor.

15. The conductive paste according to claim 6, wherein the conductive paste comprises a conductive paste for forming a primary electrode of a chip resistor.

16. The conductive paste according to claim 4, wherein the conductive paste comprises a conductive paste for forming a primary electrode of a chip resistor.

\* \* \* \* \*